US012798124B2

(12) United States Patent
Schneider et al.

(10) Patent No.: US 12,798,124 B2
(45) Date of Patent: Nov. 17, 2026

(54) GRIPPING APPLIANCE, TRAYS, SYSTEMS AND METHOD UTILIZING SAID GRIPPING APPLIANCE

(71) Applicant: Mettler-Toledo GmbH, Greifensee (CH)

(72) Inventors: Samuel Schneider, Zollikon (CH); René Weber, Esslingen (CH); Reto Clopath, Schalchen (CH); Thomas Meyer, Zürich (CH)

(73) Assignee: Mettler-Toledo GmbH, Greifensee (CH)

( * ) Notice: Subject to any disclaimer, the term of this patent is extended or adjusted under 35 U.S.C. 154(b) by 588 days.

(21) Appl. No.: 18/371,610

(22) Filed: Sep. 22, 2023

(65) Prior Publication Data

US 2024/0100721 A1 Mar. 28, 2024

(30) Foreign Application Priority Data

Sep. 26, 2022 (EP) .................................... 22197861
Sep. 26, 2022 (EP) .................................... 22197863
Feb. 13, 2023 (CH) .......................... CH000128/2023

(51) Int. Cl.
*B25J 15/08* (2006.01)
*G01N 35/00* (2006.01)

(52) U.S. Cl.
CPC ........ *B25J 15/086* (2013.01); *G01N 35/0099* (2013.01)

(58) Field of Classification Search
CPC B25J 15/0009; B25J 15/0033; B25J 15/0038; B25J 15/0042; B25J 15/0052;
(Continued)

(56) References Cited

U.S. PATENT DOCUMENTS 3,312,496 A * 4/1967 Boutelle .............. B25J 17/0241 294/115
3,734,556 A * 5/1973 Misawa ............... B25J 15/0206 294/86.41

(Continued)

FOREIGN PATENT DOCUMENTS

CN 2253947 Y 5/1997
CN 102059688 A 5/2011

(Continued)

*Primary Examiner* — Joshua E Rodden

(74) *Attorney, Agent, or Firm* — Standley Law Group LLP; Jeffrey S. Standley; Adam J. Smith

(57) ABSTRACT

A gripping appliance is disclosed. A head assembly is releasably attached to, and extends distal from, a base member. A plunger actuator moves a plunger along a proximal-distal axis of the gripping appliance. The head assembly includes a carrier with a through opening which receives the plunger and at least two gripping legs. Each of the gripping legs include a tip portion distal of a fixation portion, an actuation portion adjacent to and proximal of the tip portion, and a flex portion between the actuation and fixation portions. The actuation portions contact the plunger when the plunger is in an extended, distal position. The fixation portions are rigidly mounted to the carrier. The actuation and tip portions are distal from the carrier. When no force is transferred from the plunger to the gripping legs, the tip portions converge in a proximal-distal direction of the gripping appliance.

17 Claims, 8 Drawing Sheets

(58) Field of Classification Search

CPC ...... B25J 15/02; B25J 15/0206; B25J 15/022; B25J 15/0226; B25J 15/024; B25J 15/0253; B25J 15/0266; B25J 15/0273; B25J 15/028; B25J 15/0293; B25J 15/08; B25J 15/083; B25J 15/086; B25J 15/10; B25J 15/103; B25J 15/106; B25J 15/12; G01N 35/0099

USPC .................................................. 294/192, 198

See application file for complete search history.

(56) References Cited

U.S. PATENT DOCUMENTS

| | | | | |
|---|---|---|---|---|
| 5,317,939 | A | 6/1994 | Marinescu | |
| 5,544,474 | A * | 8/1996 | Finkelstein | A01D 46/30 56/10.2 A |
| 6,935,666 | B2 | 8/2005 | Muramatsu | |
| 7,083,210 | B2 * | 8/2006 | Muramatsu | B25J 15/12 294/99.1 |
| 7,128,874 | B2 | 10/2006 | Kittock et al. | |
| 9,132,555 | B2 * | 9/2015 | Nakayama | B25J 15/12 |
| 10,307,913 | B2 * | 6/2019 | Azazi | B25J 15/024 |
| 11,483,976 | B2 | 11/2022 | Knopf et al. | |
| 12,246,437 | B2 * | 3/2025 | Bellandi | B25J 15/0273 |
| 2008/0073922 | A1 * | 3/2008 | Holtz | B25J 15/0213 901/1 |
| 2008/0223101 | A1 * | 9/2008 | Moeck | B21D 43/006 72/306 |
| 2009/0200812 | A1 | 8/2009 | Mambru | |
| 2014/0340809 | A1 * | 11/2014 | Tseng | B25J 15/0226 361/213 |
| 2019/0387678 | A1 * | 12/2019 | Knopf | A01D 46/253 |

FOREIGN PATENT DOCUMENTS

| | | | | |
|---|---|---|---|---|
| CN | 107280537 | A | 10/2017 | |
| DE | 102014226317 | A1 | 6/2016 | |
| JP | H2-63399 | U | 5/1990 | |
| JP | 2010-203843 | A | 9/2010 | |
| JP | 2019018304 | A * | 2/2019 | B25J 15/08 |
| JP | 2021-39964 | A | 3/2021 | |
| JP | 2021-91083 | A | 6/2021 | |
| KR | 2020077933 | A * | 7/2020 | |
| NL | 2003558 | C2 | 3/2011 | |

* cited by examiner

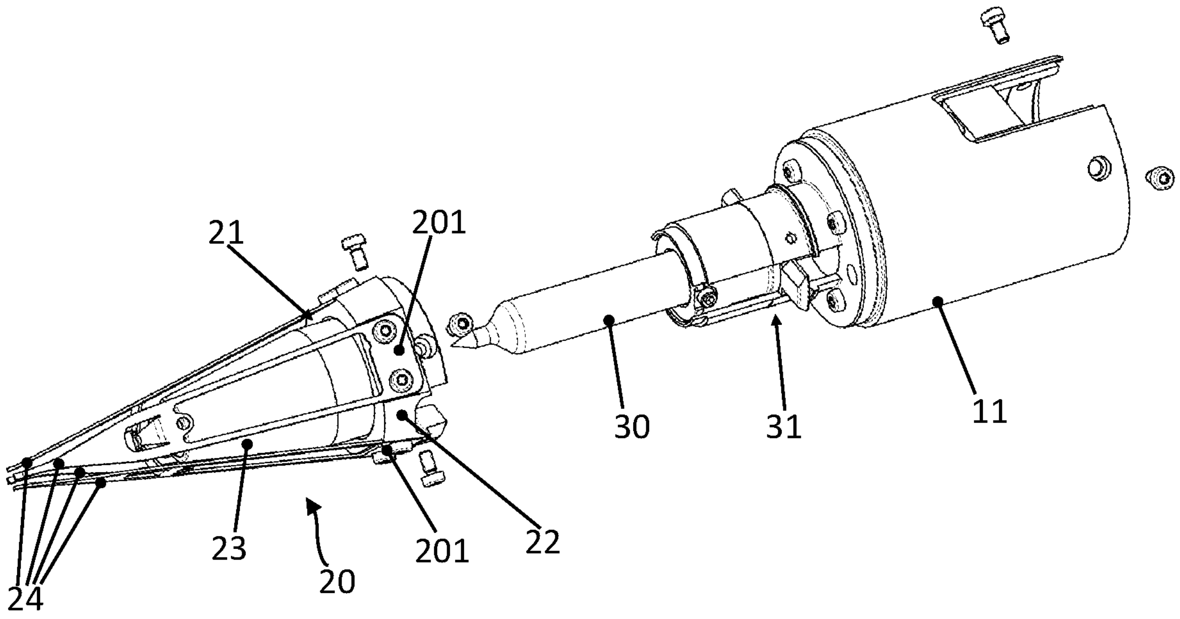
Fig. 5
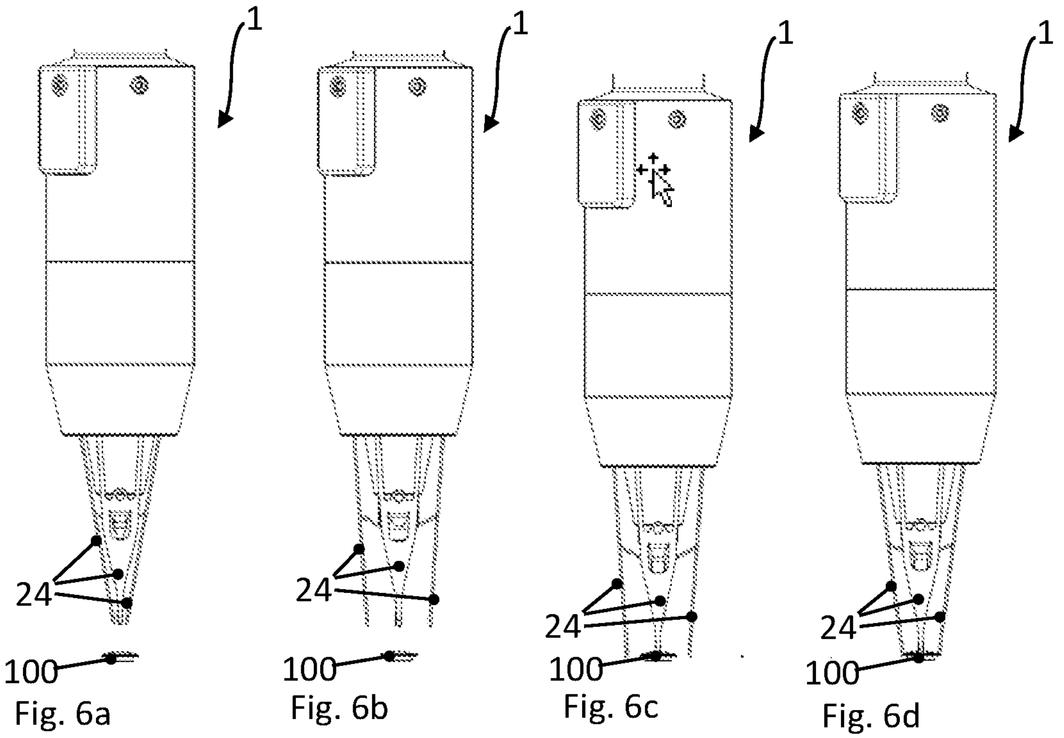
Fig. 6a Fig. 6b Fig. 6c Fig. 6d
Fig. 6

GRIPPING APPLIANCE, TRAYS, SYSTEMS AND METHOD UTILIZING SAID GRIPPING APPLIANCE

CROSS-REFERENCE TO RELATED APPLICATIONS

This application claims the benefit of European Patent Application No. EP22197861.2 filed Sep. 26, 2022, this application also claims the benefit of European Patent Application No. EP22197863.8 filed Sep. 26, 2022, and this application also claims the benefit of Swiss Patent Application No. CH000128/2023 filed Feb. 13, 2023, the disclosures of each of the foregoing are hereby incorporated by reference as if fully rested herein.

TECHNICAL FIELD

The present disclosure relates generally to a gripping appliance, and systems and methods utilizing said gripping appliance, and in more specific aspects to the subject matter set forth in the claims.

BACKGROUND OF THE DISCLOSURE

Numerous fields of technology require the conveyance of samples to and from measurement appliances. A non-limiting example is in thermal analysis systems for material characterization, wherein crucibles containing a sample need to be placed, for non-limiting instances, in a furnace of a differential scanning calorimeter or a thermogravimetric analysis instrument, and be removed from the furnace once the measurement is completed. The placing tolerance shall be low, for instance less than 0.2 mm from an aim point, so as to achieve highest accuracy of the measurement and/or analysis performed. JP 2010-203843 discloses a device suitable to replace and measure automatically and successively a plurality of samples in a simultaneous measuring device for an X-ray and thermal analysis using a partition, a furnace body cover or the like. To this extent, JP 2010-203843 suggests a conveyance device having gripping members which are pivotably suspended by axes. A centrally arranged plunger serves to actuate the grippers, whereas the lower ends of the grippers are urged to pivot towards each other by a spring. However, given the high cycle number such a gripping appliance will usually be subjected to, wear for instance of the axes and the corresponding running surfaces of the grippers might become an issue. Also, ease of replacement of components is relevant in order to reduce downtime and cost upon maintenance.

SUMMARY OF THE INVENTION

It is an object of the present disclosure to provide a gripping appliance of the type initially mentioned. In one aspect, the herein suggested gripping appliance shall overcome certain issues of the art. The gripping appliance shall in aspects be suitable for the conveyance of samples to and from, for non-limiting instances, a furnace of a differential scanning calorimeter or a thermogravimetric analysis instrument. In further aspects, the herein disclosed gripping appliance shall be easy and fast to maintain and to repair, and contain a minimum of parts which are subject to wear or are otherwise prone to fail. In still a further aspect, it is desirable that any components which are subject to wear or are otherwise prone to fail are easy to replace. Further, it might prove advantageous if in particular those components which are subject to wear or are otherwise prone to fail are low cost components. In further aspects, the gripping appliance shall enable a high placement accuracy of a sample and/or shall have a low space requirement in a plane where the sample is located.

This is achieved by the subject matter described in claim 1.

Further effects and advantages of the disclosed subject matter, whether explicitly mentioned or not, will become apparent in view of the disclosure provided below.

Accordingly, disclosed is a gripping appliance comprising a base member and a head assembly releasably attached to the base member and extending distal from the base member. The gripping appliance further comprises a plunger actuator and a plunger. The plunger actuator is arranged and configured to move the plunger along a proximal-distal axis of the gripping appliance. The plunger actuator and the plunger may in embodiments form part of or be attached to the base member. The term "distal" may denote a direction towards an end of the appliance where the appliance is intended to be brought into contact with and manipulate an object, while "proximal" denotes the opposite direction. The spatial orientation of the proximal-distal axis may in aspects be defined by the axis along which the plunger may move. A longitudinal axis of the plunger may in embodiments define the proximal-distal axis. The head assembly comprises a carrier and a number of at least two gripping legs, which may in particular embodiments be equidistantly arranged along the circumference of the carrier. A number of three, four, or more gripping legs may prove advantageous, as three or more gripping legs, in particular if equidistantly arranged along the circumference of the carrier of the head assembly, result in an intrinsic centering function on a gripped object, and at the same time avoid that a gripped object laterally slips out between the gripping legs. It is understood, however, that if the gripping legs are provided with appropriately contoured gripping tips, the risk of a gripped object slipping out between the gripping legs can be largely reduced, if not avoided. The carrier further has a through opening extending along the proximal-distal axis and configured and arranged to receive the plunger therethrough. In aspects, it may be said that a longitudinal extent or axis of the through opening defines the proximal-distal axis of the gripping appliance. A cross-sectional shape and dimension of said through opening may correspond to a cross-sectional shape and dimension of the plunger such that the through opening of the carrier allows the plunger to be received therein and move inside the through opening along the proximal-distal axis of the head assembly, or the gripping appliance, respectively, at least within a minimum required range of motion. The through opening may in embodiments guide the plunger during said movement. It is implicitly defined by said arrangement that, if the plunger extends distally from the carrier, the distal part of the plunger is located inside a space between the gripping legs. The gripping legs each comprise a fixation portion, a tip portion distal of the fixation portion, an actuation portion adjacent to and proximal of the tip portion, and a flex portion defined between the actuation portion and the fixation portion. The actuation portions of the gripping legs are configured to be in contact with the plunger at least when the plunger is in an extended, distal position. The fixation portions of the gripping legs are rigidly, that is, non-articulated, mounted to the carrier of the head assembly. At least the actuation portions and the tip portions of the gripping legs are arranged distal from the carrier of the head assembly and the gripping legs are arranged such that, when no force is transferred from the plunger to the gripping legs, the tip portions of the gripping legs converge in a proximal-distal direction. i.e., towards a distal end, of the gripping appliance.

The actuation portions of the gripping legs may be configured to be in contact with the plunger in that the gripping legs are shaped and arranged on the carrier such that a clearance of a passage surrounded by the actuation portions, when no force is transferred from the plunger to the gripping legs, is smaller than a cross sectional dimension of a part of the plunger which is intended to be moved at an axial, or proximal-distal, position of the actuation portions.

Preferably, the range of motion of the plunger is chosen such that it can be retracted, i.e., displaced proximally, sufficiently far that it does not transfer a force onto the actuation portions of the gripping legs. In further embodiments, the range of motion and the shape of the plunger is chosen such that it can be retracted, i.e., displaced proximally, sufficiently far that a part of the plunger comes into contact with the actuation portions of the gripping legs and displaces the actuation portions of the gripping legs by a first amount.

The plunger can be extended, i.e., displaced distally, so that a part of the plunger comes into contact with the actuation portions of the gripping legs and displaces the actuation portions of the gripping legs by a second amount. The displacement of the actuation portions in the radially outward direction causes a displacement of the tip portions of the gripping legs, radially outward, whereby the distal gripping end of the gripping appliance opens. At the same time, the flex portions of the gripping legs are flexed, which yields a radially inward directed restoring force to be exerted on the actuation portions and the tip portions.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

As indicated above, the plunger comprises a contact portion intended for contact with the actuation portions of the gripping legs. In particular, the contact portion may comprise a tapered portion which is tapered towards a distal end of the plunger. At least a proximal or aft end of the contact portion has a cross-sectional dimension which is larger than a clearance of a passage surrounded by the actuation portions of the gripping legs when no force is transferred from the plunger to the gripping legs. The plunger may in particular have a circular cross section, in which case the cross-sectional dimension is a diameter. In further embodiments, the plunger may have a cross section of a regular polygon whereby the number of sides of the polygon equals the number of gripping legs, in which case the cross-sectional dimension is an inscribed circle diameter. It may be found advantageous if the tapered portion extends further distally to a cross sectional dimension or diameter which is smaller than the clearance of the passage surrounded by the actuation portions of the gripping legs when no force is transferred from the plunger to the gripping legs. This ensures that the contact portion of the plunger smoothly runs into contact with the actuation portions of the gripping legs. Proximal from the tapered portion the contact portion of the plunger, i.e., at least a part of the plunger proximally adjacent the tapered portion of the contact portion, may have a constant cross section, or, in more particular embodiments, be cylindrically shaped, along the proximal-distal extent of the plunger. This enables the contact portion to be smoothly introduced between the contact portions of the gripping legs with the undersized distal part of the tapered portion ahead, while gradually spreading the actuation portions and hence the tip portions of the of the gripping legs when further travelling distally. Once a proximal end of the tapered portion has been reached, the constant cross-section portion of the contact portion comes into contact with the actuation portions of the of the gripping legs, thus maintaining a constant opening of the gripping legs when the plunger is further advanced distally. For the sake of completeness, it shall be noted that the cross section of said constant cross-section portion of the contact portion is at least essentially the same as that of the proximal end of the tapered portion. The outer surface of the plunger, at least in the contact portion, is continuous, without steps which might hinder smooth sliding of the contact portion of the plunger and the actuation portions of the gripping legs relative to each other.

A distal end of the plunger may be pointed and form a distally pointing spike. Said spike may be used to pierce, for instance, a lid of a crucible by advancing the plunger distally. In providing the contact portion of the plunger with a proximal portion of constant cross-section along a proximal-distal, or axial, extent, the plunger may be advanced distally to pierce a lid without effecting a further actuation of the gripping legs.

In further non-limiting embodiments, the tip portions of the gripping legs in a very distal tip portion, adjacent and forming a distal end or tip of the gripping legs, are angled away from the center of the gripping appliance relative to the more proximal portions of the tip portions, so as to at least converge to a lesser degree in the proximal-distal direction than the more proximal portions of the gripping legs when no force is transferred from the plunger to the gripping legs. Said geometry of the very distal tip regions of the tip portions yield a smoother contact of these very distal tip portions with an object to be gripped. Ideally, the very distal tip regions extent at least essentially in the proximal-distal direction and not or only insignificantly in a radial inward or outward direction when gripping an object. It might thus be, as outlined in more detail below, that the gripping legs are specifically chosen for a particular object to be gripped.

The fact that the head assembly is releasable attached to the base member facilitates said task. Rather than replacing each gripping leg individually at the gripping appliance, the entire head assembly can be changed to a head assembly bearing gripping legs of different geometry and/or stiffness of the flex section. The gripping fingers comprise no movable parts, bearings and so forth, which avoids wear of such elements. Rather, the gripping legs are rigidly attached to the carrier of the head assembly, and the gripping movement is enabled by the flex portions of the gripping fingers, which provides superior lifetime when compared to gripping legs which comprise or are attached to the head assembly or the base member via hinges. Once the flex portions should degrade due to continuous oscillation, the entire head assembly may be replaced and the gripping legs themselves may be replaced offline, which reduces downtime and facilitates maintenance.

The above-described gripping appliance can be provided with slender tip portions of the gripping legs. The drive of the gripping legs is provided comparatively far proximal and radially inward from the gripping legs. As a result, the distal tip portion of the gripping appliance can be built with a low space requirement, which in turn enables the use of the gripping appliance in connection with a multitude of quite narrowly placed samples. In other words, in connection with the herein described gripping appliance a narrow arrangement of samples is enabled, which in turn means a larger number of samples can be provided in a given space or on a given surface. Moreover, the herein described gripping appliance may be used in restricted space environments.

In another aspect, disclosed is a head assembly for a gripping appliance as described above, wherein the carrier comprises a number of flat outer mounting surfaces rotational-symmetrically arranged around an outer circumference of the carrier. In particular, the number of flat outer mounting surfaces may equal the number of gripping legs. The fixation portions of the gripping legs comprise flat mounting surfaces abutting the flat outer mounting surfaces. In non-limiting embodiments, the gripping legs are mounted to the carrier by screws extending through the fixation portions of the gripping legs.

In still a further aspect, disclosed is a gripping leg for a gripping appliance and/or a head assembly as outlined above. The flex portion is configured with a minimum bending stiffness in response to a moment induced by a force acting perpendicular to a plane of the flex portion. The resistance against bending in other directions may be chosen considerable higher. The actuation portion comprises a base which extends between and merges into the tip portion and the flex portion. The actuation portion further comprises a tongue which originates from the base. The tongue projects from the base. Preferably, a tongue angle is between 5° and 85°. The tongue angle is the angle between the plane of the flex portion and a connecting line between a point on the origin of the tongue and a point on the tip of the tongue. The tip of the tongue are the points with the greatest distance from the base.

The gripping leg may be mounted on the carrier of the head assembly such that the tongue extends radially inward. The tongue, or a tip of the tongue, respectively, in this case constitutes a counterpart abutment for the plunger.

In a preferred embodiment, the tongue angle is greater than the cone angle of the tapered portion of the plunger. Thereby, it is ensured that the tip of the tongue establishes the contact with the plunger, which results in a smooth and controlled motion of the tip portions.

In a preferred embodiment, the distance between the tip of the tongue and the base is greater than half of the difference between the cross-sectional dimension of the plunger at the proximal and the distal end of its tapered portion. Thereby, it is prevented that the base or the flex portion of the gripping legs contact the plunger. Consequently, the control of the motion of the tip portions is improved.

In non-limiting embodiments, the flex portion is trapezoidally shaped and widening from the actuation portion towards the fixation portion. More particularly, the flex portion may be shaped as a frame comprising two flex legs extending along the sides of the flex portion between the actuation portion and the fixation portion. The trapezoidal shape of the flex portion may yield effects on the kinematics of the tip portion, such as to yield a straight leg travel.

The tongue of the actuation portion may be slanted towards the tip portion, thus avoiding mutual locking of the tongue and the plunger when the plunger travels into the distal direction and is in contact with the tongue. The tongue may have the shape of a trapezoid with a straight baseline whereby the side opposite of the straight baseline is formed as rounded concave arch, thus having a tip line for contact with a plunger of circular cross-section. In further embodiments, the tongue may have the shape of a rounded convex arch, extending between the end points of the straight baseline.

A window may be formed in the base of the actuation portion, having a size and shape at least essentially conformant with or greater than the size and shape of the tongue. Said window has a straight baseline, wherein the straight baseline of the tongue joins the straight baseline of the window and the tongue extends from the straight baseline of the window. The straight baseline of the window in more particular embodiments forms the proximal boundary of the window. The actuation portion may be manufactured by cutting the shape of the tongue, with the exception of the straight baseline, into the base of the actuation portion, for instance by laser cutting, and subsequently bending the tongue away from the base of the actuation portion into the desired direction and about a desired amount, thereby forming the window in the base. The transition between the base and the tongue is provided in the straight baseline.

The gripping leg may be a seamless one-piece member. However, it may be assembled from individual segments. For instance, the tongue may be joined to the base, and may for more particular, non-limiting instances be glued, welded, soldered, screwed or riveted. The gripping leg can be made of sheet metal. In some embodiments, the tongue may be realized by a wedged part of a material. The material of the tongue and the base may differ, for example to choose a material with desirable gliding properties for tongue while choosing a material with desirable flexing properties for the flex portion of the gripping leg.

Further disclosed is a conveyance system configured and adapted to convey objects, for instance crucibles, between at least two locations. The conveyance system comprises a gripping appliance as set forth above and at least one drive configured to move the gripping appliance along the proximal-distal axis of the gripping appliance and perpendicular to the proximal-distal axis of the gripping appliance.

As outlined above, in the herein described gripping appliance yields, in particular at its distal tip where samples are manipulated, very low space requirements. To this extent, disclosed is a sample manipulation system which comprises at least one of a gripping appliance and/or head assembly as set forth above, and further a tray. The tray has a top side comprising a multitude of receiving indentations which are intended, configured and adapted for receiving a sample. The receiving indentations may be configured for use with samples or crucibles of a specific shape and size. It may be provided that the receiving indentations are at least essentially circular in cross section, and the distance between the outer rim of a receiving indentation and the outer rim of a closest neighboring receiving indentation is 20% of the diameter of a receiving indentation or less. The samples and/or crucibles may thus be densely packed on the tray. In further, more specific embodiments elongated indentations may in addition be provided which extend radially from and merge into the receiving indentations. The number of elongated indentations extending radially from and merging into each of the receiving indentations is at least equal to the number of gripping legs of the gripping appliance and/or the head assembly, and at least some of the elongated indentations merging into each of the receiving indentations are circumferentially distributed in a circumferential pattern conformant to a circumferential pattern formed by the gripping legs around the gripping appliance and/or the head assembly. The tray according to the invention has a top side comprising a multitude of receiving indentations. Every one of the receiving indentations is intended, configured and/or adapted for receiving a sample. The receiving indentations may be configured for use with samples, such as crucibles, of a specific shape and size. The tray according to this embodiment comprises further a coding.

The coding is preferably an electronic coding. Most preferably the electronic coding is a memory or a chip which can be read out via the same conductor with which it is powered. Such chips are for example known as 1-Wire Chips. Such an electronic coding has the advantage that it offers great flexibility in the length and structure of the coding while still allowing the tray to be stored without a power source on its own. In alternative embodiments of an electronic coding, a memory or a chip providing the coded information returns the information via a conductor different from the ones with which it is powered. In some embodiments, the tray may comprise a power source for the coding such as a rechargeable battery. An electronic coding is flexible and robust as soiled contacts can easily be cleaned, if needed while the memory or the chip itself can be embedded in the tray and thereby protected from the surrounding.

In further embodiments, the coding is a mechanical coding. Most preferably, the mechanical coding is a pattern machined in a side wall or in the lower side of the tray which is suitable to be read out by a set of contact sensors or by the way it scatters or blocks a light signal. In further embodiments, the coding is a RFID chip.

In still further embodiments, the coding is a 2D-coding pattern such as for example a bar code or a QR code. In addition or instead, the coding can be a human readable number and/or letter combination, applied onto the tray.

Preferably, the electronic, mechanical, RFID chip coding and/or the 2D-coding pattern is arranged on one of the side walls or the lower side, opposite of the top side, of the tray. Most preferably, the human readable code and/or the 2D-coding pattern is arranged on the top side of the tray. Preferably, the tray comprises a human readable code on its top side in addition to an electronic, mechanical, RFID chip coding and/or a 2D-coding pattern which is arranged on one of the side walls or the lower side, opposite of the top side, of the tray.

Preferably, the coding comprises information about a class of trays to which a given tray belongs and/or a unique identification. Preferably, the coding comprises information about a class of trays to which a given tray belongs in addition to an identification which makes it unique. The trays of a given class of trays can for example comprise receiving indentations which are intended, configured and adapted for receiving a sample of the same specific shape and size. In further embodiments, trays of a given class of trays comprise a different number of receiving indentations than trays of other classes. In further embodiments, trays of a given class of trays comprise a different arrangement of receiving indentations than trays of other classes.

Preferably a user can create user specific coding for the trays used by himself, most preferably with a computer program. The user specific coding can be written into the electronic coding, associated to signal of the RFID chip and/or printed on a label comprising the respective 2D-coding pattern and/or the human readable code to allow the user to adapt the trays to an existing sample or object management system. Most preferably, the user specific coding comprises only the unique identification, while the information about the class of trays is predefined by the manufacturer of the trays. This prevents conflicts which could occur, if the user sets by accident a unique identification which is later chosen by the manufacturer to represent a class of trays.

The use of a coding attached to the tray has the advantage that the tray can be identified—either automatically or with the help of the user—by a sample manipulation system and/or a conveyance system. This allows to adapt the motion of the gripper to the tray and to the samples for which the receiving indentations are intended and adapted for. In a preferred embodiment, for example, the gripper is instructed to open to a greater extend if the tray is identified as a tray of a class adapted to samples with a greater diameter than in a case where the tray is identified as a tray of a class adapted to samples with a smaller diameter. Similarly, the motion of the gripper can be adapted to a comply with the arrangement of the receiving indentations on trays of the identified class of trays. The gripper is preferably a gripping appliance according to the invention. The motion of the gripper and the extend of its opening are preferably controlled by a control which acts on the respective drives for the different motions.

By including a unique coding to each tray, the user can identify a given sample by its location on a tray together with its unique coding. The control of the gripper can use this information to specifically handle the sample in question by identifying the tray using its unique coding and moving the gripper to the given location of the sample on the tray in question. This facilitates the preparation of the samples. Further, the unique coding of the tray can allow the user to instruct the gripper to handle samples from the specified tray differently than samples from other trays. For example, the acceleration of the gripper while gripping a sample can be reduced, if a given sample is particular sensitive to accelerations.

Arranging a human readable code and/or a 2D-coding pattern on the top side of the tray facilitates the user to access the coding of the tray, even if it is already loaded with samples. Thereby, the user can assign tray specific instructions to the control of the gripper even after the samples are arranged on the tray. A 2D-coding pattern can be scanned with a suitable scanner, e.g., a barcode or QR scanner, and thereby automatically entered in an interface to the control to allow the user to specify instructions related to the tray and/or to samples arranged on it. Also, a human readable code can be detected automatically, for example by a camera. Further, a user can input the human readable code of the tray in question into the interface of the control by e.g., typing it in or reading it out loud. The interface to the control can be a part of the control itself or it can be an assistant program, running on a computer or on a mobile device for example, which is equipped to transmit the data to the control in a suitable format.

Preferably the tray is blue. The samples analysed with a thermal analysis system are typically crucibles which are golden, metallic grey and/or white. Therefore, there is a significant colour contrast to a blue tray which facilitates the recognition of samples on the tray and the identification of empty receiving indentations. For such a recognition, the thermal analysis systems are preferably equipped with a camera. The camera can be arranged on the gripper, in a lid covering the trays arranged in the tray holder in times where no access to them is needed or in another place of the system from where the sample tray in the tray holder is visible. The visible recognition of samples on the tray allows to detect which receiving indentations are occupied and which ones are empty. This information can be used by the control of the gripper, e.g., to avoid trying to grasp a sample at an empty receiving indentation. The information can also be transmitted to the user in order to allow him to check on the status of the samples and the tray and/or to estimate the time until new samples are needed. In other embodiments, empty receiving indentations can be detected by the gripper itself due to the amount by which it can close without significant resistance.

In one embodiment, of the tray the receiving indentations are at least essentially circular in cross section. Elongated indentations extend radially from the receiving indentations. In this embodiment, the trays are particularly well equipped to be used with the gripping appliance according to the invention, as the elongated indentations give the gripping legs more freedom to move. Without such elongated indentations, only samples which extend above the top side of the tray can be grasped by the gripping appliance according to the invention. Elongated indentation of different shapes can be used with other types of grippers where legs might approach the samples on other paths. For example, spiral-like elongated indentations might be used for trays to be used with grippers with legs approaching the sample on spiral-like paths.

In one embodiment the distance between the outer rim of a receiving indentation and the outer rim of a closest neighboring receiving indentation is 20% of the diameter of a receiving indentation or less. The samples and/or crucibles may thus be densely packed on the tray.

In one embodiment, the length of the elongated indentations is greater than the distance between the outer rim of a receiving indentation and the outer rim of a closest neighboring receiving indentation. Thereby, the gripping legs have more space to open towards the sides of the sample than the distance between the samples. This allows the samples and/or crucibles to be densely packed on the tray. The length of the elongated indentations is preferably measured as the distance between the outer rim of an incircle of a receiving indentation and the outer rim of an incircle of a second receiving indentation which arranged in the direction in which the elongated indentation is elongated.

In one embodiment elongated indentations may be provided which extend radially from and merge into the receiving indentations. The number of elongated indentations extending radially from and merging into each of the receiving indentations is at least equal to the number of gripping legs of the gripping appliance and/or the head assembly, and at least some of the elongated indentations merging into each of the receiving indentations are circumferentially distributed in a circumferential pattern conformant to a circumferential pattern formed by the gripping legs around the gripping appliance and/or the head assembly.

Preferably, the gripper is part of a sample manipulation system. This sample manipulation system comprises a tray holder. The tray holder is adapted to hold a tray comprising a coding. Preferably, the tray holder comprises means to read out the coding of the tray.

Alternatively, means to read out the coding of the tray can be arranged outside of the tray holder and can comprise for example a camera arranged in a lid, on the gripper or on another part of the sample manipulation system or its surrounding form where a visible coding of the tray can be seen. Instead of a camera and a visible coding, an electronic coding can be read out in some distance by a reader comprising an antenna for receiving an electromagnetic signal emitted or reflected by the electronic coding which can e.g., be attached to the gripper, a lid or another part of the sample manipulation systems. Movable parts such as gripper and lid can also establish an electrical and/or mechanical contact to read out a coding.

Preferably, the sample manipulation system comprises further a control of the gripper. This control is suitable to control the gripper while considering the information stored in the coding of the tray. The advantages of such a control where already outline above.

Preferably, means to read out the coding of the tray are means to read out the electronic, mechanical, RFID chip coding and/or the 2D-coding pattern. Preferably, means to read out the coding of the tray are arranged on one of the side walls or the lower side of the tray holder such that they can read out the respective coding of the tray once the tray is inserted into the tray holder. This allows to position the coding and the means to read it out in a well-defined and small distance of each other. This allows to use means to read out which need a physical contact such as an electrical connection and optimizes the signal quality if means to read out comprise detectors to receive a signal such as an emitted or reflected radio signal or a scattered or reflected light signal. It further allows the means to read out to read out the code by detecting a mechanical contact or a proximity.

Most preferably, the tray comprises an electronic coding which comprises a memory or a chip which can be read out by the same conductors which provide power to the memory or chip in question and the tray holder comprises contact regions in which conductors to power and read out the memory or the chip comprising the coding of the tray are provided. Once the tray is arranged in the tray holder, the contact regions of the tray holder contact the contacts of the electronic coding of the tray and the information of the coding stored in the memory or the chip can be read out. Further, the receipt of the signal indicates the presence of the tray in the tray holder.

The sample manipulation system is preferably part of a thermal analysis systems for material characterization. The gripper is preferably a gripping appliance according to the invention.

Preferably, the tray holder is adapted to hold the tray in a predefined orientation. Most preferably, the tray holder comprises an indentation into which the tray fits.

In a preferred example the tray is, in the view on its top side, rectangular, whereby at least one of the sides of this rectangle comprises an indentation or a protrusion such that the symmetry of the rectangular shape is broken and a unique orientation is defined with respect to a tray holder with a correspondingly shaped protrusion or indentation.

Preferably, the control of the gripper is the control of the gripping appliances and is part of the thermal analysis system for material characterization.

Preferably, the means to read out the coding of the tray transmit the read out data to the control of the gripper, where the control can use this information to adapt the motion of the gripping appliances depending on the information stored with the coding.

Preferably, the coding comprises information of a class of a tray. Preferably, a database is accessible by the control or stored in the control which associates information specific for a class of trays with the coding indicating this class. The information can be, for example, the size and diameter of samples which fit in the receiving indentations of the trays of this class and/or the arrangement of the receiving indentations on trays of this class.

Preferably, a tray comprises a piercing position. Preferably, the piercing position is an elevation on the top side of the tray. This elevation is essentially circular in cross section. The height of the elevation with respect to its surrounding is such that tip portions of the gripping legs do not collide with the tray during the piercing action of a sample arranged on the piercing position. Proving such piercing position on a tray has the advantage that it facilitates the control of the piercing process and that it can be replaced and cleaned easily if needed.

In still further aspects, disclosed is a method of conveying an object between at least two locations. The method comprises:

- providing a gripping appliance of any type outlined above;
- positioning the gripping appliance with the proximal-distal axis of the gripping appliance intersecting the object and the distal tips provided at the distal or forward ends of the tip portions of the gripping legs being arranged proximate to the object;
- moving the plunger into a distal direction of the gripping appliance, whereby the plunger contacts the actuation portions of the gripping legs and forces the tip portions of the gripping legs radially apart, thereby effecting an elastic deformation of the flex portions of the gripping legs;
- moving the gripping appliance distally so as to position the distal tips of the gripping legs circumferentially enclosing the object;
- retracting the plunger in a proximal direction, whereby elastic restoration forces of the flex portions of the gripping legs cause a gripping movement of the tip portions, thereby affixing the object to the gripping appliance; and
- moving the gripping appliance with the object affixed thereto to a place of destination.

Subsequently, the object may be placed at the place of destination and the plunger may be advanced into the distal direction, whereby the plunger contacts the actuation portions of the gripping legs and forces the tip portions of the gripping legs radially apart, thereby releasing the object. After the object has been released, the gripping appliance may be moved in the proximal direction so as to get clear of the object.

As suggested above, the gripping legs may be chosen so as to fit a specific object. In this respect, the method may further comprise selecting a head assembly out of a multitude of head assemblies, wherein the head assembly is selected such that the flex portions of the gripping legs induce a defined radially inward acting force at the tip portions when the plunger is retracted and the tip portions abut the object. In aspects, the head assembly may be chosen such that a frictional force induced by the radially inward acting force and effective between the tip portions of the gripping legs and the object is greater than the weight force of the object.

As further suggested above, the plunger may comprise a pointed distal tip. The object may be a crucible comprising a sample and the method may comprise moving the plunger distally to pierce and perforate a lid closing the crucible with the pointed distal tip of the plunger.

It is understood that the features and embodiments disclosed above may be combined with each other. It will further be appreciated that further embodiments are conceivable within the scope of the present disclosure and the claimed subject matter which are obvious and apparent to the skilled person by virtue of the present disclosure.

BRIEF DESCRIPTION OF THE DRAWINGS

The subject matter of the present disclosure is now to be explained in more detail by means of selected exemplary embodiments shown in the accompanying drawings. The figures show:

FIG. 5 the gripping appliance of FIG. 1 in an exploded view;

FIG. 6 the process of gripping an object with a gripping appliance of the type herein described;

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

DETAILED DESCRIPTION OF EXEMPLARY EMBODIMENT(S)

Figure 1:
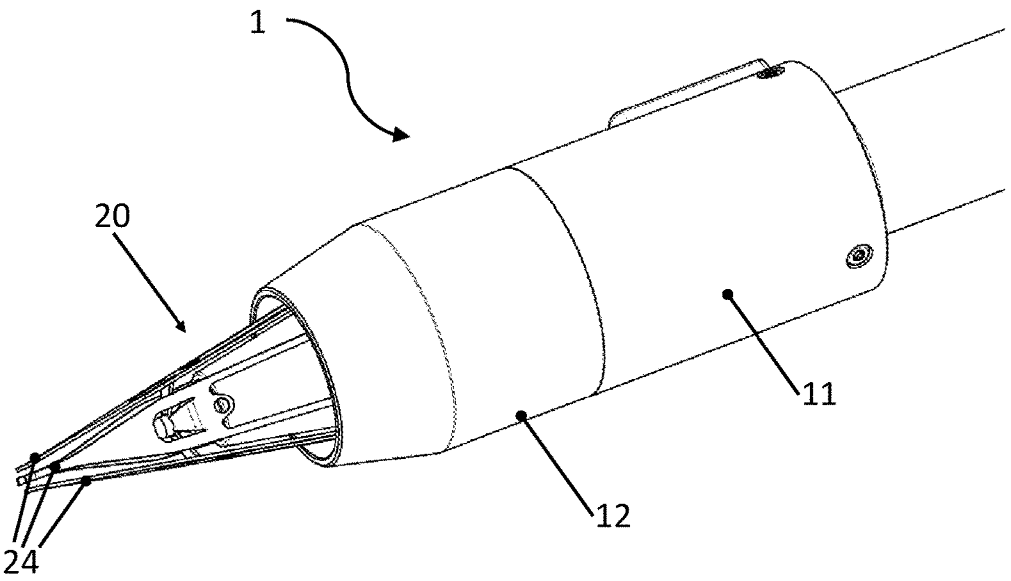
FIG. 1 an exemplary embodiment of a gripping appliance with distally closed gripping legs.

FIG. 1 shows an exemplary gripping appliance 1 of the herein disclosed kind with the gripping legs closed. Gripping appliance 1 comprises base member 11 and head assembly 20 with gripping legs 24 extending in a distal direction from a carrier of the head assembly. In the depiction of FIG. 1 the carrier of the head assembly is largely covered by outer sleeve 12. As is readily appreciated, gripping appliance 1 has a proximal-distal axial orientation. A distal or forward end of the gripping appliance is defined by the free end tips of gripping legs 24. The proximal end of the gripping appliance is defined by the axially opposite end of base member 11. It is appreciated that the term “distal” denotes the working side of an instrument, while the term “proximal” denotes the side on which the instrument is attached to a support or comprises a handle.

Figure 2:
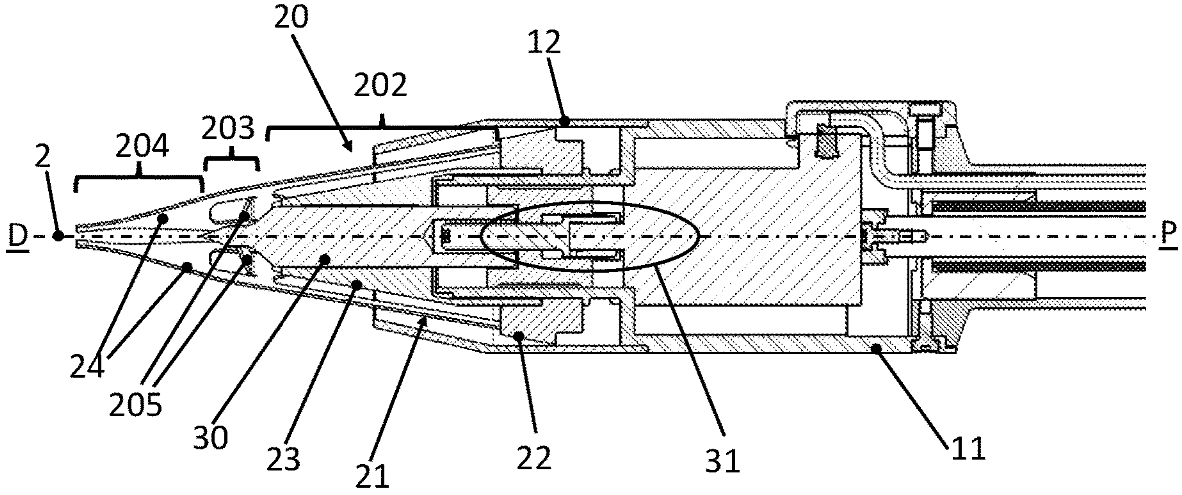
FIG. 2 the gripping appliance of FIG. 1 with distally closed gripping legs in a sectional view.

FIG. 2 shows a longitudinal view of gripping appliance 1 of FIG. 1 along the proximal-distal axis of the instrument. Base member 11 is supported and for instance connected to a drive for moving the gripping appliance on the proximal side, while head assembly 20 is releasably attached to the base member 11 and extends distal from the base member 11. Head assembly 20 comprises a carrier 21 and a number of, in the exemplary embodiment shown, four gripping legs 24. Carrier 21 comprises mount 22 and guide sleeve 23. Carrier 21 generally tapers in the distal direction. Base member 11 comprises a plunger actuator 31 and a plunger 30 extending through a central through opening in the carrier 21 of the head assembly 20. Plunger actuator 31 is arranged and configured to move or displace plunger 30 along the proximal-distal axis 2 of the gripping assembly. Proximal-distal axis 2 extends between a proximal side P and a distal side D of the gripping assembly. Plunger actuator 31 may in one instance be a stepper motor which allows controllable travel and placement of plunger 30 along proximal-distal axis 2. Plunger 30 is guided inside the through opening inside guide sleeve 23. In aspects, it may be said that a longitudinal axis of the through opening inside guide sleeve 23 defines proximal-distal axis 2. Proximal fixation portions of gripping legs 24 are rigidly, i.e., non-articulated, attached to mount 22 of carrier 21 of head assembly 20. The fixation portions of the gripping legs are not visible in the present depiction. Each one of gripping legs 24 comprises a distally arranged tip portion 204, an actuation portion 203 adjacent to and proximal of tip portion 204, and a flex portion 202 adjacent to and proximal of actuation portion 203 and defined between and connecting actuation portion 203 and the fixation portion. Each actuation portion 203 comprises a tongue 205 and a base. Each of the tongues 205 projects and extends radially inward from the base of its actuation portion 203. The tongues 205 are slanted in a distal direction, towards tip portions 204. As will become fully appreciated by virtue of the description below, tongues 205 are configured to be in contact with plunger 30 at least when plunger 30 is in an extended, distal position. As will further be appreciated by virtue of the description below, plunger 30 is configured and adapted to exert a radially outward directed force onto actuation portions 203 of gripping legs 24 and displace the actuation portions, and hence also the tip portions, radially outward, depending on the position of plunger 30 along proximal-distal axis 2. In the situation depicted in FIGS. 1 and 2, however, plunger 30 is in a retracted, proximal position, and no or little force is transmitted from the plunger to the gripping legs. The gripping legs are arranged such that, when the plunger 30 is in the retracted position, the tip portions 204 of the gripping legs converge in a proximal-distal direction of the gripping appliance, towards their distal tips, or the distal side D of the gripping appliance, respectively.

Figure 3:
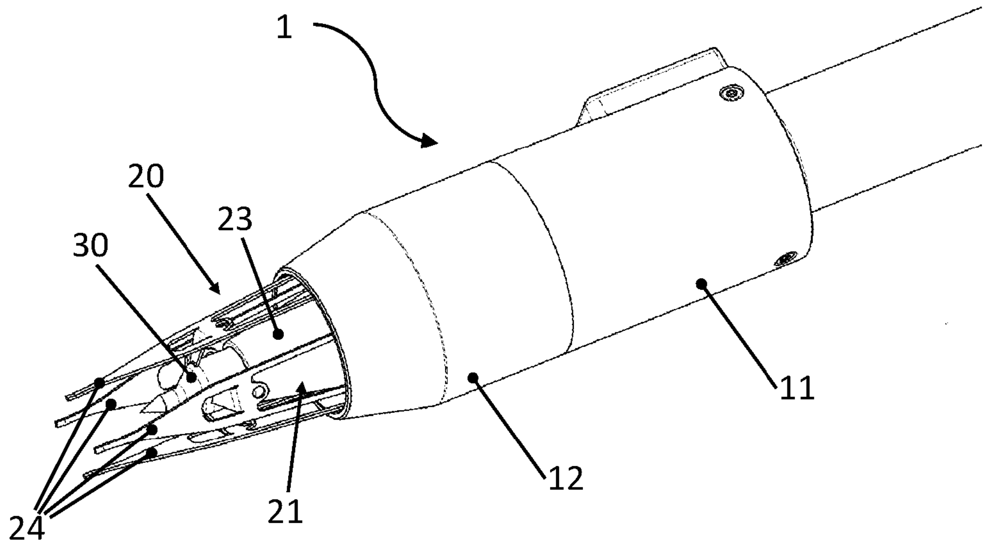
FIG. 3 the gripping appliance of FIG. 1 with distally opened gripping legs.
Figure 4:
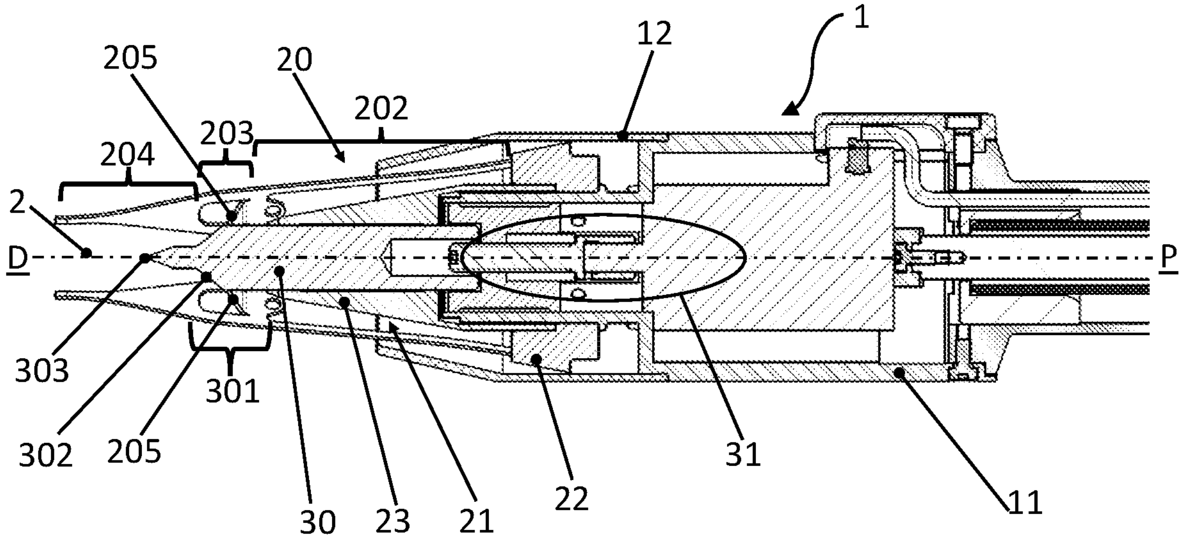
FIG. 4 the gripping appliance of FIG. 1 with distally opened gripping legs in a sectional view.

FIGS. 3 and 4 show gripping appliance 1 of FIGS. 1 and 2 with gripping legs 24 opened. A comparison between FIGS. 1 and 3, or FIGS. 2 and 4, respectively, reveals that plunger 30 is in a more distal, extended position. Plunger 30 comprises a contact portion 301 on its lateral surface. Contact portion 301 comprises a relatively distally provided tapered portion 302 and a constant cross-section, or, in the specific non-nonlimiting example, cylindrical portion adjacent to and proximal from said tapered portion. When plunger 30 is displaced in the distal direction, from the proximal, retracted position as shown in FIGS. 1 and 2, to a distal, extended position, as shown in FIGS. 3 and 4, tapered portion 302 of contact portion 301 of plunger 30 is gradually pushed into the clearance between the actuation portions 203 of the gripping legs, or, more specifically, the radial inner tips of tongues 205, starting at a relatively small cross-sectional extent of tapered portion 302 and progressing to a relatively larger cross-sectional extent of tapered portion 302. As a result, the actuation portion 203 and tip portions 204 of gripping legs 24 are successively spread apart and the gripping appliance is opened. As the proximal fixation portions of the gripping legs are rigidly, that is, non-articulated, attached to mount 22, the flex portions 202 of the gripping legs flex, thus yielding a radially inward directed restoring force on the more distally arranged actuation portions 203 and tip portions 204. Said restoring force is exerted on plunger 30, which in turn exerts a radially outward directed force onto actuation portions 203 of gripping legs 24. It will be appreciated that said force increases while the plunger is advanced in the distal direction and the actuation portions 203, or tongues 205, respectively, bear on tapered portion 302 of plunger 30. Once the plunger is sufficiently advanced in the distal direction such that the actuation portions 203 or tongues 205, respectively, bear on the constant cross-section portion of contact portion 301, the radial outward displacement of and consequently the spreading force exerted on the actuation portions of gripping legs 24, remains constant, irrespective of the proximal-distal position of plunger 30. A distal end of plunger 30 is pointed and forms a spike 303. Once the actuation portions 203, or tongues 205, respectively, of the gripping legs bear on the constant cross-section portion of actuation portion 301 of plunger 30, plunger 30 can be advanced in the distal direction without any effect on the gripping legs, until spike 303 gets into contact with an object, like, for instance, a lid of a crucible, and pierce the lid, thus exposing a sample comprised inside the crucible to the environment. The skilled person will further appreciate that upon a retracting movement of plunger 30 in a proximal direction, as soon as the actuation portions 203, or tongues 205, respectively, bear on the tapered portion 302 of contact portion 301, the actuation portions and tip portions 204 of the gripping legs will, due to the restoring force exerted by flexed flex portions 202, successively travel radially inward, i.e., close the gripping appliance. If, however, an object is placed between tip portions 204 prior to retracting plunger 30 from the position shown in FIGS. 3 and 4, tip portions 204 will bear on said object and a remaining restoring force, which is dependent upon the cross-sectional dimension of the object, is exerted on the object. That means, said object is held between, or gripped by, tip portions 204. Said grip can be released in again advancing plunger 30 in the distal direction. The comparatively steep angle of tapered portion 302 of contact portion 301 of plunger 30 translates a defined axial travel of the plunger into a comparatively large radial travel of the tip portions. However, said kinematics may be influenced in accordingly selecting the cone angle of tapered portion 302.

FIG. 5 shows an exploded view on a gripping appliance as shown in FIGS. 1 through 4. As can be seen in this view, mount 22 of carrier 21 of head 20 comprises a number of outer mounting surfaces rotationally symmetrical and circumferentially equidistant arranged around the outer circumference of mount 22. Proximal fixation portions 201 of the gripping legs are fixedly attached to the mount at the mounting surfaces, for instance by screws. It is well noted that fixation portions 201 of gripping legs 24 are inhibited from any movement on the mount 22, or carrier 21, respectively. Any relative movement between the tip portions of gripping legs 24 and carrier 21 can thus only be achieved by flexing of the flex portions of the gripping legs. Plunger actuator 31 is attached to base member 11. Plunger 30 extends distally from plunger actuator 31 and is intended to be received through the through opening in carrier 21, or guide sleeve 23, respectively, as outlined in connection with FIGS. 2 and 4.

The gripping appliance outlined in connection with FIGS. 1 through 4 may be connected to at least one drive which is configured to move the gripping appliance along the proximal-distal axis of the gripping appliance as well as in a plane perpendicular to the proximal-distal axis of the gripping appliance, so as to form a conveyance system which is configured and adapted to convey crucibles or other objects between at least two locations.

An exemplary process of gripping an object is outlined in connection with FIG. 6. An object 100, for instance a crucible, is placed on a surface. As shown in FIG. 6*a*, the gripping appliance 1 is initially positioned over the object, with the proximal-distal axis of the gripping appliance intersecting the object and the distal tip of the gripping legs 24 being arranged proximate to the object, i.e., pointing downward in the specifically shown example. The plunger is advanced in the distal direction of the gripping appliance, i.e., towards object 100, thus forcing the distal tips of gripping legs 24 apart and opening the gripping appliance, as depicted in FIG. 6*b*. Subsequently, gripping appliance 1 is moved in the distal direction, which is downward in the shown exemplary embodiment, so as to position the distal tips of the gripping legs circumferentially enclosing the object, as depicted in FIG. 6*c*. The plunger may then be retracted in the proximal direction, whereby the tip portions of the gripping legs 24 travel radially inward due to the elastic restoring forces of the flexed flex portions of the gripping legs. The tip portions thus abut object 100 and exert a radially inward directed force on object 100. The skilled person will readily appreciate that said force exerted on the object depends on the cross-sectional dimension of the object on the one hand, and the geometry of the gripping legs and the spring stiffness of the flex portions of the gripping legs on the other hand. Thus, the head may be chosen dependent on the cross-sectional dimension and weight of object 100 as a head equipped with gripping legs which are selected to yield a radially inward directed gripping force on the object within a range sufficient to induce a frictional force greater than the weight of the object on the one hand, but on the other hand to avoid damage to the object by excess force. Once the object is affixed to the gripping appliance by the radially inward acting restoring forces of the flex portions, the object may be lifted from the surface in moving the gripping appliance proximally, or upward in the specific example. The gripping appliance may travel to a place of destination. The subsequent process of placing the object at a place of destination is apparent to a person having skill in the art by virtue of the above presented process and explanations as to the function of the gripping appliance. It is noted that if the number of gripping legs is three or more, and in particular the gripping legs are furthermore circumferentially equidistant distributed, the radially inward directed forces exerted on an object are self-centered, and there is no danger of the object laterally slipping out between the gripping legs.

Figure 7:
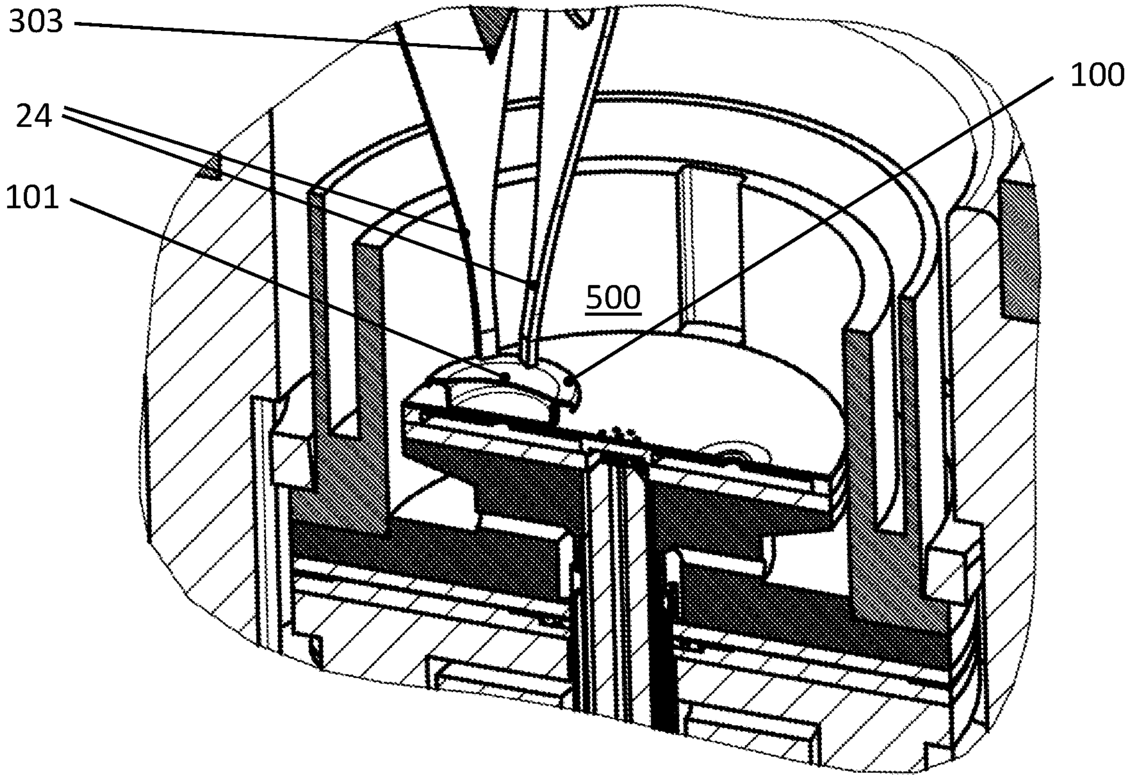
FIG. 7 the distal part of the gripping appliance of the herein described type with in a furnace, wherein further a crucible is placed inside a furnace.

In the example shown in FIG. 7 a crucible 100 has been placed inside the furnace 500. The crucible 100 is closed on the top side by a lid 101 and may contain a sample. The plunger with the distal spike 303 may be advanced distally to pierce and penetrate lid 101 with spike 303, thereby exposing the sample contained in crucible 100 to the environment inside the furnace 500.

Figure 8:
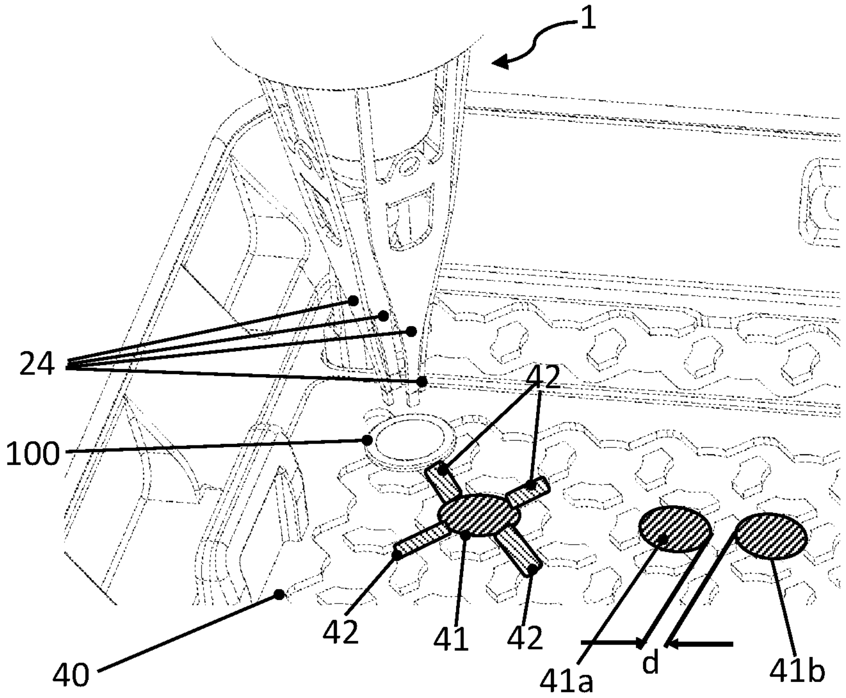
FIG. 8 a sample manipulation system comprising a gripping appliance of the herein described type and a tray.

FIG. 8 outlines a sample manipulation system which comprises a gripping appliance 1 and a tray 40. The tray has a top side which comprises a multitude of receiving indentations 41, 41*a*, 41*b* intended and adapted for receiving a crucible 100. The slender design of the distal end of gripping appliance 1, comprising tip portions of gripping legs 24, enable two neighboring crucibles to be placed very close to each other. The receiving indentations may have a circular cross section, and the distance d between two immediately neighboring receiving indentations, like for instance 41*a* and 41*b*, may be 20% or less of the diameter of the receiving indentations. This allows a dense arrangement of crucibles on the tray. Elongated indentations 42 are, in addition to the receiving indentations, provided in the top side of tray 40. The elongated indentations 42 extend radially from and merge into the receiving indentations 41. Four elongated indentations 42 are shown to merge into each receiving indentation 41. This number equals the number of gripping legs 24 provided on the gripping appliance. The elongated indentations 42 have the same circumferential distribution around the receiving indentations 41 as the gripping legs around the proximal-distal axis of the gripping appliance. The width of elongated indentations 42 is at least the width of the distal portion of a tip portion of a gripping leg. This allows the tip portions of the gripping legs to be received, at least with their distal tip regions, inside the elongated indentations 42 merging into a receiving indentation 41 and move inside said elongated indentations, radially with respect to the receiving indentation. This allows the gripping and releasing travel of the tip portions of gripping legs 24. In the shown embodiment, the elongated indentations connect and merge into two diagonally neighboring receiving indentations. Thus, the length of an elongated indentation is approximately 1.4 times the minimal distance d between two closest neighboring receiving indentations 41*a* and 41*b*, which allows for sufficient travel distance of the tip portions of gripping legs 24 on a tray on which crucibles are densely packed. Further, the elongated indentations 42 are deeper than receiving indentations 41, which also supports unrestricted travel of the tip portions of gripping legs 24 inside the elongated indentations.

Figure 9:
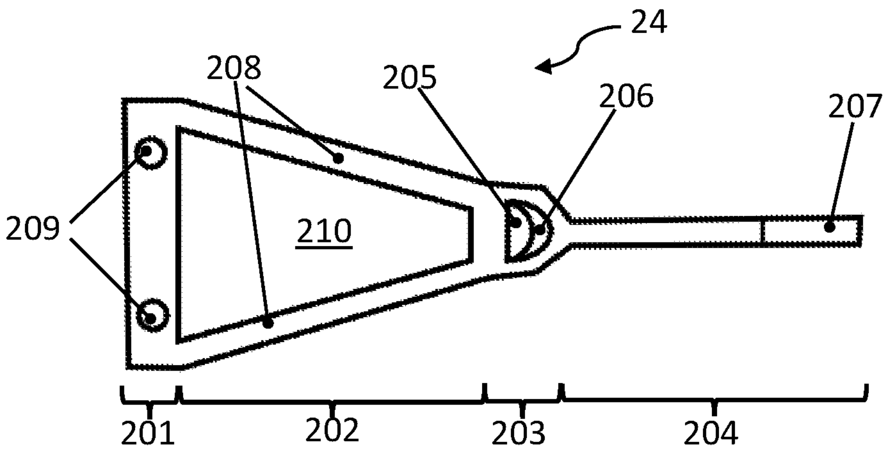
FIG. 9 a first embodiment of a gripping leg for a gripping appliance of the herein described type in a plane view.
Figure 10:
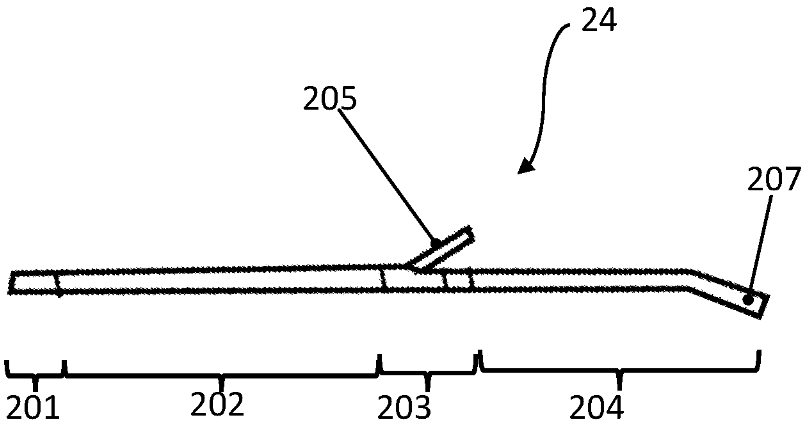
FIG. 10 the gripping leg of FIG. 9 in a side view.
Figure 11:
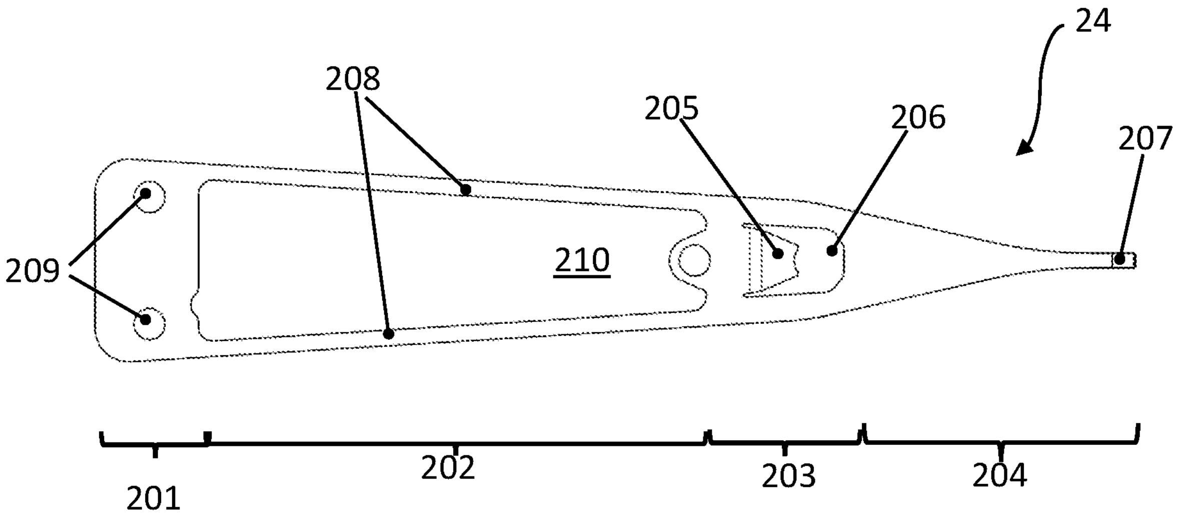
FIG. 11 a first embodiment of a gripping leg for a gripping appliance of the herein described type in a plane view.
Figure 12:
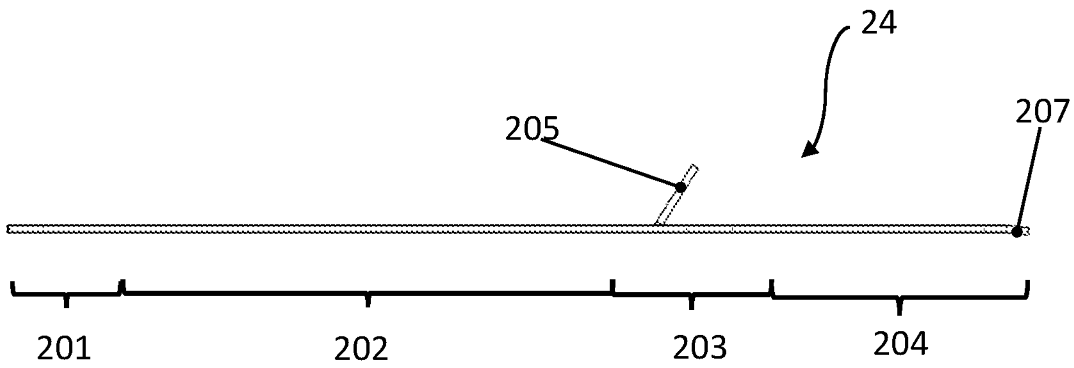
FIG. 12 the gripping leg of FIG. 11 in a side view.

FIGS. 9 through 12 illustrate exemplary embodiments of gripping legs 24 as such. FIG. 9 shows a plain view and FIG. 10 shows a side view of a first embodiment of a gripping leg. FIG. 11 shows a plain view and FIG. 12 shows a side view of a second embodiment of a gripping leg. As becomes apparent from FIG. 9, gripping leg 24 comprises proximal fixation portion 201 with holes 209 therethrough for receiving screws for attaching the gripping leg to a carrier of a head, as outlined above. Gripping leg 24 further comprises flex portion 202, actuation portion 203 and tip portion 204. Flex portion 202 extends distally from fixation portion 201. Flex portion 202 is generally trapezoidally shaped and tapers in the distal direction and further merges into actuation portion 203, which is provided distally adjacent the flex portion. Flex portion 202 comprises two flex legs 208 extending from the fixation portion, with a window 210 shaped therebetween. Flex portion 202 has a minimum bending stiffness against a moment which is induced by a force acting along an axis perpendicular to a plane of the flex portion, in the current depiction perpendicular to the plane of drawing. In other directions, however, the bending stiffness is relatively higher such as to prevent the tip portion from lateral swerving movements. Flex legs 208 converge distally and merge into actuation portion 203. If a gripping leg is rigidly attached to the head of a gripping appliance, as outlined above, at the fixation portion 201, and actuation portion 203 is forced radially outward by the plunger of the gripping appliance, said movement requires bending of a portion interposed between fixation portion 201 and actuation portion 203. If said bending occurs within the elasticity limits of the interposed portion, the interposed portion flexes, yielding an elastic restoring force. Hence, flex portion 202 is actually defined between fixation portion 201 and actuation portion 203. The trapezoidal shape of the flex portion ensures straight radial travel of the tip portions upon actuation of a gripping leg mounted to a gripping appliance of the type outlined above by the plunger. Actuation portion 203 comprises tongue 205 and window 206. As becomes apparent by virtue of FIGS. 10 and 12, respectively, tongue

205 projects from the base of actuation portion 203 into a first direction relative to the general proximal-distal extent of gripping leg 24. Further, tongue 205 is slanted into the distal direction, i.e., towards tip portion 204. Thus, the sliding movement between the tongue of a gripping leg mounted to a gripping appliance and the plunger of the gripping appliance when the plunger moves distally to force the distal part of the gripping leg radially outward is facilitated.

In the embodiment according to FIG. 9, window 206 and tongue 205 are generally arched, wherein tongue 205 merges into the base of actuation portion 203 at a common straight baseline of arched tongue 205 and arched window 206. Tongue 205 comprises a rounded tip intended to get in contact with the plunger. Said rounded shape further supports a smooth sliding between the plunger and the tongue.

In the embodiment according to FIG. 11, window 206 is essentially rectangular while the tongue 205 has a trapezoidal shape wherein the side opposite of the baseline is concavely arched. The tongue 205 merges into the base of actuation portion 203 at a common straight baseline of the tongue 205 and the window 206. Tongue 205 comprises a rounded tip line intended to get in contact with a cylindrical plunger. Said rounded shape guides the gripping leg and helps to prevent lateral swerving movements.

Window 206 and tongue 205 can have a generally conformant size and shape or the window 206 can be greater than the tongue 205. This is due to the fact that tongue 205 may be manufactured in performing a suitable cut, for instance by laser cutting, into the base of actuation portion 203 and subsequently bending tongue 205 out of the plane of the sheet forming the base of actuation portion 203. In other embodiments, however, tongue 205 may be a separate member attached to the base of actuation portion 203. Any suitable attachment method may be applied, including, while not limited to, gluing, soldering, welding, screwing and riveting. It is understood that, if tongue 205 is an individual member attached the base of actuation portion 203, the base of actuation portion 203 may not comprise window 206.

Actuation portion 203 distally merges into tip portion 204, which is distally adjacent to actuation portion 203. Tip portion 204, in a very distal portion 207, is angled with respect to a more proximal portion of the tip portion. The very distal portion 207 is angled in a direction opposite to that of tongue 205. As will be appreciated, when gripping leg 24 is properly mounted to a head or a gripping appliance as outlined above, tongue 205 projects radially inward from the base of actuation portion 203. Accordingly, very distal portions 207 of the tip portions 204 of the gripping legs mounted to the head or gripping appliance are less convergent in the distal direction when compared to the more proximal portions of the tip portions 204, or might even diverge distally, dependent upon the specific geometry of a gripping leg and the position of the plunger, i.e., dependent upon whether the gripping appliance is opened or closed at its distal end. Said angulation of the very distal tip portion 207 might serve to better accommodate an object to be gripped. Gripping leg 24 may generally be manufactured from a piece of sheet metal, in particular from a sheet of spring steel.

Figure 14A:
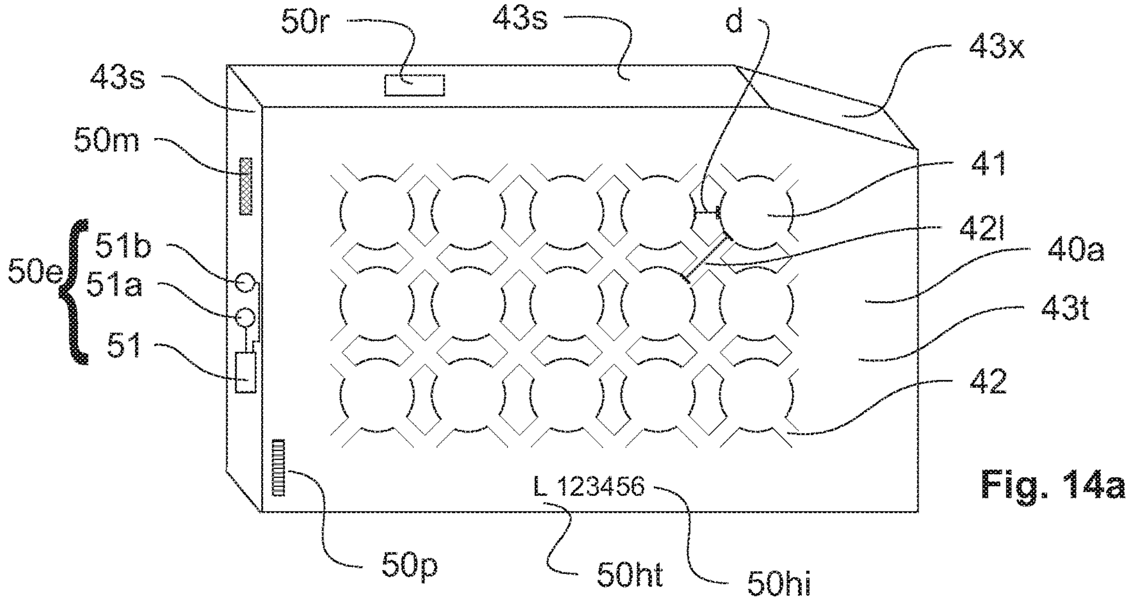
FIG. 14*a*, 14*b* Trays of different classes.

Trays 40*a, b*, are shown in more detail in FIGS. 14*a* and *b*. They have a top side 43*t* comprising a multitude of receiving indentations 41. The receiving indentations 41 are circular in cross section. The diameter of the circular cross-section of the receiving indentation 41 may differ depending on the class of the tray 40: FIG. 14*a* shows a tray 40*a* for larger objects 100 such as crucibles or samples and therefore receiving indentations 41 with a greater diameter than those of the tray 40*b* shown in FIG. 14*b* which is intended to be used with smaller objects 100.

On both trays, elongated indentations 42 extend radially from the receiving indentations 41 and connect them with each other.

As shown in FIG. 14*a*, the length 421 of the elongated indentations 42 is greater than the distance d between the outer rim of a receiving indentation and the outer rim of a closest neighboring receiving indentation. In FIG. 14*a*, it is shown how the length of the elongated indentation is preferably measured: It is the distance between the incircle of two neighboring receiving indentations which are arranged on the line comprising the two end points of the elongated indentation 42, i.e., in the case of a radially extending elongated indentation 42, the line extending in the direction in which it is elongated.

In both, FIGS. 14 *a* and *b*, the elongated indentations 42 extend radially from and merge into the receiving indentations 41. There are four radially extending elongated indentations 42 in both depicted trays 40*a* and 40*b* and this number of elongated indentations 42 is equal to the number of gripping legs 24 of the gripping appliance and/or the head assembly for which these trays 40*a*, 40*b* are constructed. The elongated indentations 42 are further circumferentially equally distributed: They are always 90° spaced apart from each other. This is conformant to the circumferential pattern formed by the gripping legs around the gripping appliance and/or the head assembly for which these trays 40*a*, 40*b* are constructed.

Trays 40 for the use with other grippers may be equipped with elongated indentations 42 of a difference shape to allow the gripping means of these grippers the needed freedom to move. If the depth of the receiving indentation 41 is smaller than the height of the objects 100, elongated indentations 42 can also be omitted if the gripper can grasp the objects 100.

Figure 14B:
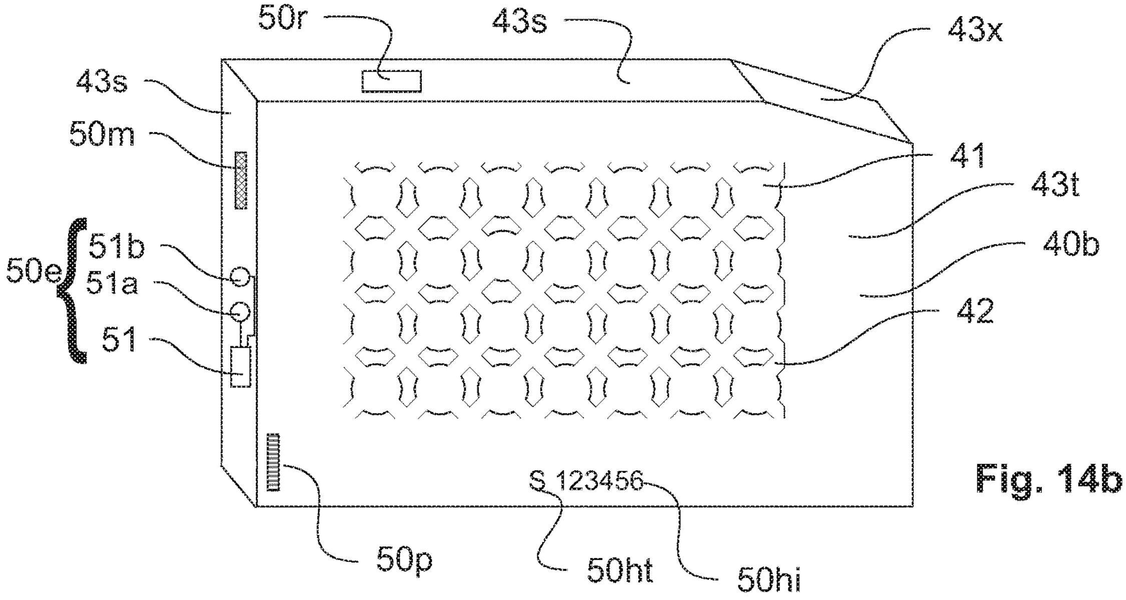

Both trays 40 shown in FIGS. 14*a* and 14*b* comprises codings 50. One of the codings is an electronic coding 50*e*. The electronic coding 50*e* comprises a chip 51 which can be read out via the same conductors with which it is powered. Contacts 51*a*, 51*b* of the conductors for the chip 51 can easily be cleaned, if needed.

A further coding 50 is a mechanical coding 50*m*. The mechanical coding 50*m* is a pattern machined in one of the side walls 43*s* of the tray 40. The mechanical coding 50*m* is suitable to be read out by suitable detection means such as set of contact sensors, by a set of proximity sensors or by the way it scatters or blocks a light signal. Another coding 50 which is depicted is a RFID chip 50*r*.

In still further embodiments, the coding 50 is a 2D-coding pattern 50*p* such as for example a bar code or a QR code. In addition or instead, the coding 50 can be a human readable number and/or letter combination 50*ht*, 50*hi*, printed or otherwise applied onto the tray 40.

The electronic 50*e*, mechanical 50*m* and RFID chip 50*r* coding 50 are arranged on one of the side walls 43*s* of the tray 40. The human readable code 50*ht*, 50*hi*, and the 2D-coding pattern 50*p* are arranged on the top side 43*t* of the tray 40.

In the depicted embodiments, the coding 50 comprises information about a class of trays to which a given tray belongs in addition to a unique identification. This is visible in the case of the human readable number and letter combination 50*ht*, 50*hi*: The letter 50*ht* indicates in this example the class of the tray, which is "L" for "trays, suitable large samples" in the case of FIG. 14*a* and "S" for "trays, suitable small samples" in the case of FIG. 14*b*. The number 50*hi* is a unique ID number such that the combination of tray class indicator and ID number can be used to identify any tray 40 in a large set of trays. Preferably a user can create user specific coding for the trays used by himself. The user specific coding can be written into the chip 51, associated to signal of the RFID chip and/or printed a label as a 2D-coding pattern 50*p* and/or as a human readable code 50*ht*, 50*hi* to allow the user to adapt the trays to an existing sample or object management system.

Figure 13:
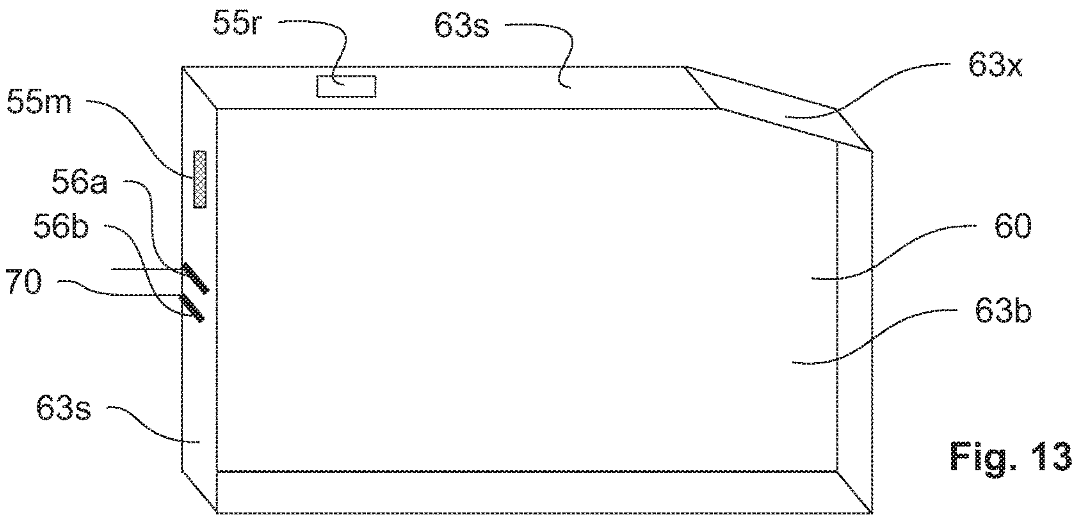
FIG. 13A tray holder.

FIG. 13 depicts a tray holder 60. The tray holder 60 is adapted to hold the tray 40 in a predefined orientation. Therefore, the tray holder 60 comprises an indentation into which the tray 40 fits.

The trays 40, depicted in FIGS. 14*a* and *b* are, in the view on their top side 43*t*, rectangular with one corner of this rectangular being replaced by a flat connecting surface between the two side walls 43*s* which would join at this corner. This results in an indentation 43*x* with respect to the rectangular shape describing the shape of the tray 40 outside of this region. Due to this indentation 43*x*, the symmetry of the rectangular shape is broken and a unique orientation is defined.

The tray holder 60, shown in FIG. 13, has a corresponding shape with a matching protrusion 63*x*, replacing one corner of the otherwise rectangular shape.

The tray holder 60 comprises means 55 to read out the coding 50 of the tray 40. The means to read out 55 are the read out electronic 55*e* of the electronic coding 50*e*, a sensor 55*m* to read out the mechanical coding 50*m*, and an RFID chip reader 55*r*. These means are arranged on the side wall 63*s* of the tray holder 60 and arranged at such locations, that they can read out the respective coding 50 of the tray 40 once the tray 40 is inserted into the tray holder 60.

Once the tray 40 arranged in the tray holder 60, the contact regions 56*a*, 56*b* of the tray holder 60 contact the contacts 51*a, b* of the electronic coding 50*e* of the tray 40 and the information of the coding 50 stored in the chip 51 can be read out and is transmitted via the line 70 to be processed or displayed.

Figure 15:
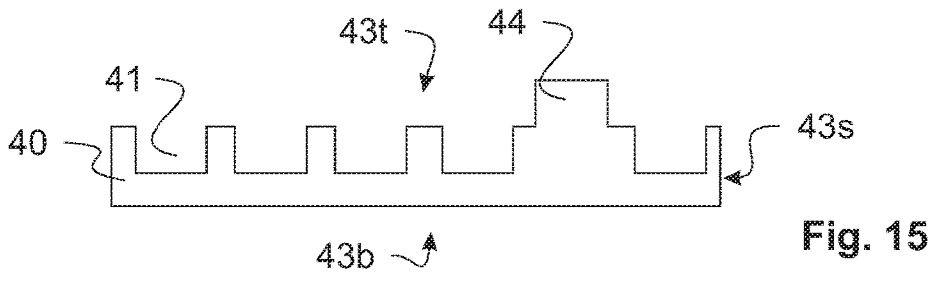
FIG. 15A cut through a tray comprising a piercing position.

FIG. 15 shows a cross-section through a tray 40 which comprises a piercing position 44. The piercing position 44 is an elevation on the top side 43*t* of the tray 40. This piercing position 44 is essentially circular in cross section, although this is not visible in the shown cross-section. The diameter of this circular cross section is essentially equal to the diameter of the receiving indentations 41. The height of the piercing position 44 with respect to its surrounding is such that tip portions of the gripping legs do not collide with the tray 40 during the piercing action of an object or crucible arranged on the piercing position 44. In the shown embodiment, the height of the piercing position 44 is essentially equal to the depth of the receiving indentations 41, which appear as a set of recesses from the top side 43*t* of the tray 40 in this view.

Figure 16:
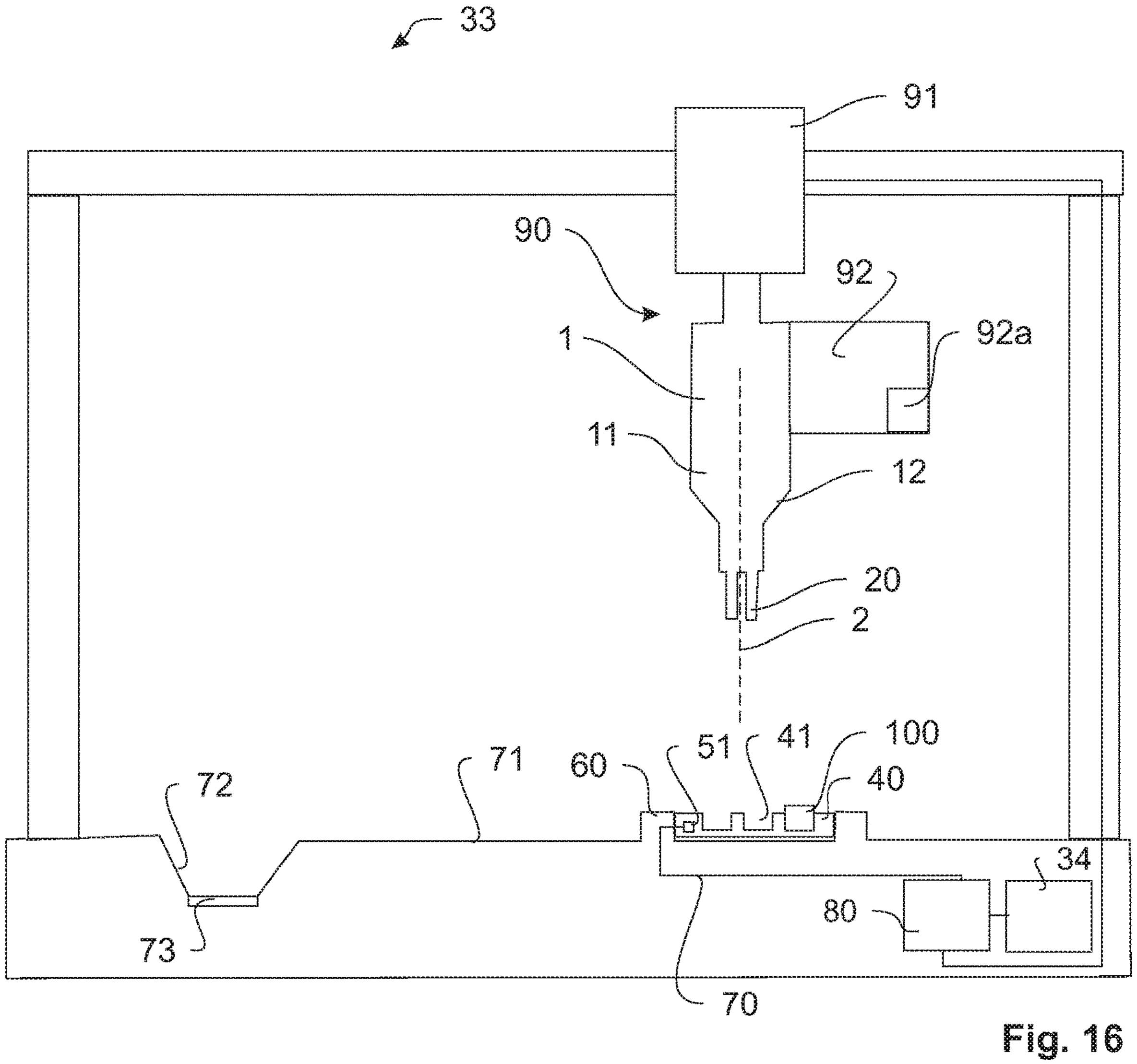
FIG. 16A thermal analysis systems.

The gripping appliances 1 is part of a sample manipulation system. The sample manipulation system is part of a thermal analysis systems for material characterization. FIG. 16 illustrates a thermoanalytical instrument 33, which is an example of a thermal analysis system. As is illustrated in FIG. 16, an essentially horizontally extending work area 71 has a funnel-shaped access channel 72 formed therein that provides access to a receiving sample support 73 of a thermoanalytical instrument 33 that is for instance a differential scanning calorimeter or a thermogravimetric instrument. The receiving sample support 73 is in this embodiment a thermoanalytical sensor. A person of ordinary skill familiar with such thermoanalytical instruments will well understand the schematic nature of the illustration of FIG. 16, while practical embodiments of such instruments may often include a removeable lid and/or a slidable suspension of the sensor to thereby expose the sensor only for the purposes of loading or unloading an object 100 to be analyzed.

At some horizontal distance from the access channel 72, a tray 40 is arranged in a tray holder 60 which is part of the work area 71. The tray 40 comprises receiving indentations 41 formed to hold a plurality of objects 100 that may specifically be crucibles for receiving specimens of materials to be analyzed. Such trays 40 may for instance be formed so as to have the objects 100 or crucibles arranged therein, for example in an array of lines and columns. A crucible is an example of an object 100.

The tray 40 is arranged in a tray holder 60. Further, the tray 40 is in the shown embodiment equipped with an electronic coding which comprises a chip 51. The tray holder 60 comprises contacts to power and read out the chip 51 via the contacts 51*a, b* on the tray 40. The contacts to power and read out the chip 51 which are comprised in the tray holder 60 are connected to a line 70 which feeds the information contained in the coding to a control 80.

The sample manipulation system shown in FIG. 16 comprises the gripping appliance 1, the tray holder 60 and the control 80. It allows the gripping appliance 1 to manipulate samples arranged on a tray 40 arranged in the tray holder 60 and to adapt this manipulation to different classes of trays 40 which can be used in this sample manipulation system.

A conveyance system 90 comprises a drive 91 and a gripper, which is in the shown embodiment a gripping appliance 1. The drive 91 is configured to move the gripping appliance 1 along the proximal-distal axis 2 of the gripping appliance 1 and perpendicular to it. The gripping appliance 1 and was described in more detail in FIGS. 1 to 6. To move the gripping appliance 1 along an axis perpendicular to the proximal-distal axis 2, the conveyance system 90 comprises a horizontal rail along which the drive 91 is for example moved by a belt. To move the gripping appliance 1 along the proximal-distal axis 2, the gripping appliance 1 can be attached to a rod arranged along the proximal-distal axis 2, which is moved up- and down by the drive 91.

In the depicted embodiment a camera 92, in this example a digital camera, is attached to the gripping appliance 1. A light source 92*a* to illuminate the camera's field of view is attached to the camera 92. Preferably, the light source 92*a* is in the form of a ring light surrounding the camera 92. The light source 92*a* preferably emits polarized light and the camera 92 includes a polarization filter so as to attenuate undesired reflections into the camera 92. The light source 92*a* for example emits white light in the visible spectrum.

The drive 91 moves the gripping appliance 1 together with the camera 92 and the light source 92*a* to various positions above work area 71 in both the horizontal directions (X-, Y-axis) and the vertical direction (Z-axis). These positions specifically include those which are appropriate for the gripping appliance 1 to receive or release objects 100 at any one of the receiving sample support 73 or the receiving indentations 41 of the tray 40, to capture images or at least partial images of any one of the receiving sample support 73, and/or an object 100, and/or the tray 40.

The thermoanalytical instrument 33 comprises further evaluation means 34: The evaluation means 34 identify an object 100 or the positions and presence of objects 100 on a tray 40 in the tray holder 60 using one or more images captured by the camera 12. The information from the evaluation means 34 is in the shown embodiment also provided to the control 80.

The information contained in the coding 50 which are transmitted to the control 80 by the line 70, allow to adapt the motion of the gripping appliance 1 to the class to which the tray 40 belongs and thereby to the objects 100 for which the receiving indentations 41 are intended and adapted for. In the depicted example, a class "L" of trays is adapted to objects with a greater diameter than trays of class "S". If the control 80 receives an information by the line 70 that the tray 40 in the tray holder 60 is of class "L" the gripping appliance 1 is instructed by the control 80 to open to a greater extend compared to the case that control 80 receives an information by the line 70 that the tray 40 in the tray holder 60 is of class "S".

In the depicted example, the information contained in the coding 50 which are transmitted to the control 80 by the line 70 includes further a unique identifier. This identifier is unique in the set of trays 40 which may be used in the thermoanalytical instrument 33 at hand. In this example, the user can identify an object by specifying its location of the tray and the unique coding of the tray. The user can, for example, specify that a sample of interest is arrange in the 3rd receiving indentations 41 in the 2nd row of the tray 40 with a given identifier. Further the user can specify that this object 100 should be moved with a smaller acceleration or that is should be the first one on the tray 40 to be measured. The control 80 of the gripping appliance and uses this information to specifically handle the defined sample as requested.

The tray 40 in the depicted embodiment is of blue color. The samples analyzed with a thermal analysis system are typically crucibles which are golden, metallic grey and/or white. Therefore, there is a significant color contrast to the blue tray 40. This facilitates the recognition of samples on the tray and the identification of empty receiving indentations which is done by the evaluation means 34.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

The invention claimed is:

1. A gripping appliance comprising:

a base member;

a plunger actuator;

a plunger; and a head assembly releasably attached to the base member and extending distal from the base member, wherein the plunger actuator is arranged and configured to move the plunger along a proximal-distal axis of the gripping appliance;

wherein the head assembly comprises a carrier and at least two gripping legs, the carrier having a through opening extending along the proximal-distal axis and configured and arranged to receive the plunger therethrough;

wherein the gripping legs each comprise a fixation portion, a tip portion distal of the fixation portion, an actuation portion adjacent to and proximal of the tip portion, and a flex portion defined between the actuation portion and the fixation portion, wherein the actuation portions of the gripping legs are configured to be in contact with the plunger at least when the plunger is in an extended, distal position;

wherein the fixation portions of the gripping legs are rigidly mounted to the carrier of the head assembly and wherein at least the actuation portions and the tip portions of the gripping legs are arranged distal from the carrier of the head assembly and the gripping legs are arranged such that, when no force is transferred from the plunger to the gripping legs, the tip portions of the gripping legs converge in a proximal-distal direction of the gripping appliance.

2. The gripping appliance of claim 1, wherein:

the plunger comprises a contact portion configured for contact with the actuation portions of the gripping legs, wherein the contact portion comprises a tapered portion which is tapered towards a distal end of the plunger, and at least a proximal end of the contact portion has a cross sectional dimension which is larger than a clearance of a passage surrounded by the actuation portions of the gripping legs when no force is transferred from the plunger to the gripping legs, and wherein the contact portion further comprises a portion of constant cross-section adjacent to and proximal from the tapered portion, such that a radial outward displacement of the actuation portions of the gripping legs remains constant irrespective of a further distal advancement of the plunger.

3. The gripping appliance of claim 1, wherein:

a distal end of the plunger is pointed.

4. The gripping appliance of claim 1, wherein:

the tip portions of the gripping legs in a very distal tip portion are angled away from the center of the gripping appliance, so as to at least converge to a lesser degree in the proximal-distal direction than the more proximal portions of the gripping legs when no force is transferred from the plunger to the gripping legs.

5. The gripping appliance of claim 1, wherein:

the carrier comprises a number of flat outer mounting surfaces rotational-symmetrically arranged around an outer circumference of the carrier, and the fixation portions of the gripping legs comprise flat mounting surfaces abutting the flat outer mounting surfaces.

6. The gripping appliance of claim 1, wherein:

the flex portion is configured with a minimum bending stiffness in response to a moment induced by a force acting perpendicular to a plane of the flex portion; and the actuation portion comprises a base which extends between and merges into the tip portion and the flex portion, and further comprises a tongue which originates from the base, wherein the tongue projects from the base.

7. The gripping appliance of claim 6, wherein:

the flex portion is trapezoidally shaped and widening from the actuation portion towards the fixation portion; and the flex portion is shaped as a frame comprising two flex legs extending along the sides of the flex portion between the actuation portion and the fixation portion.

8. The gripping appliance of claim 6, wherein:

the tongue is slanted towards the tip portion.

9. A conveyance system configured and adapted to convey objects between at least two locations, the conveyance system comprising:

the gripping appliance of claim 1; and at least one drive configured to move the gripping appliance along the proximal-distal axis of the gripping appliance and perpendicular to the proximal-distal axis of the gripping appliance.

10. A sample manipulation system, comprising:

the gripping appliance of claim 1; and a tray, wherein the tray has a top side comprising a multitude of receiving indentations intended and adapted for receiving a sample, wherein the receiving indentations are at least essentially circular in cross section and include an outer rim, and a distance between the outer rim of one of the receiving indentations and the outer rim of a closest neighboring one of the receiving indentations is 20% of a diameter of the receiving indentations or less.

11. A method of conveying an object between at least two locations, the method comprising:

providing the gripping appliance of claim 1;

positioning the gripping appliance with the proximal-distal axis of the gripping appliance intersecting the object and the distal tips of the gripping legs being arranged proximate to the object;

moving the plunger into a distal direction of the gripping appliance, whereby the plunger contacts the actuation portions of the gripping legs and forces the tip portions of the gripping legs radially apart, thereby effecting an elastic deformation of the flex portions of the gripping legs;

moving the gripping appliance distally so as to position the distal tips of the gripping legs circumferentially enclosing the object;

retracting the plunger in a proximal direction, whereby elastic restoration forces of the flex portions of the gripping legs cause a gripping movement of the tip portions, thereby affixing the object to the gripping appliance; and moving the gripping appliance with the object affixed thereto to a place of destination.

12. The method of claim 11, further comprising:

placing the object at the place of destination; and advancing the plunger into the distal direction, whereby the plunger contacts the actuation portions of the gripping legs and forces the tip portions of the gripping legs radially apart, thereby releasing the object, and moving the gripping appliance in the proximal direction.

13. The method of claim 11, further comprising:

selecting the head assembly out of a multitude of head assemblies, wherein the head assembly is selected such that the flex portions of the gripping legs induce a defined radially inward acting force at the tip portions when the plunger is retracted and the tip portions abut the object.

14. The method of claim 13, wherein:

the head assembly is chosen such that a frictional force induced by the radially inward acting force and effective between the tip portions of the gripping legs and the object is greater than the weight force of the object.

15. The method of claim 11, wherein the plunger has a pointed distal tip and the object is a crucible, the method comprising moving the plunger distally to pierce and perforate a lid closing the crucible with the pointed distal tip.

16. The gripping appliance of claim 1, wherein the head assembly is releasably attached to the base member such that the head assembly is replaceable by a further head assembly, and wherein gripping legs of the further head assembly differ from the gripping legs of the head assembly in at least one of a geometry of the gripping legs and a bending stiffness of a flex portion of the gripping legs.

17. The gripping appliance of claim 1, wherein the fixation portions of the gripping legs are non-articulated and the gripping legs comprise no bearings and no hinges, such that a relative movement between the tip portions of the gripping legs and the carrier is achievable only by flexing of the flex portions of the gripping legs.

* * * * *